Feb. 12, 1963 R. E. STUTZKE ETAL 3,077,024
SHEET METAL FILE
Filed June 20, 1958 4 Sheets-Sheet 2
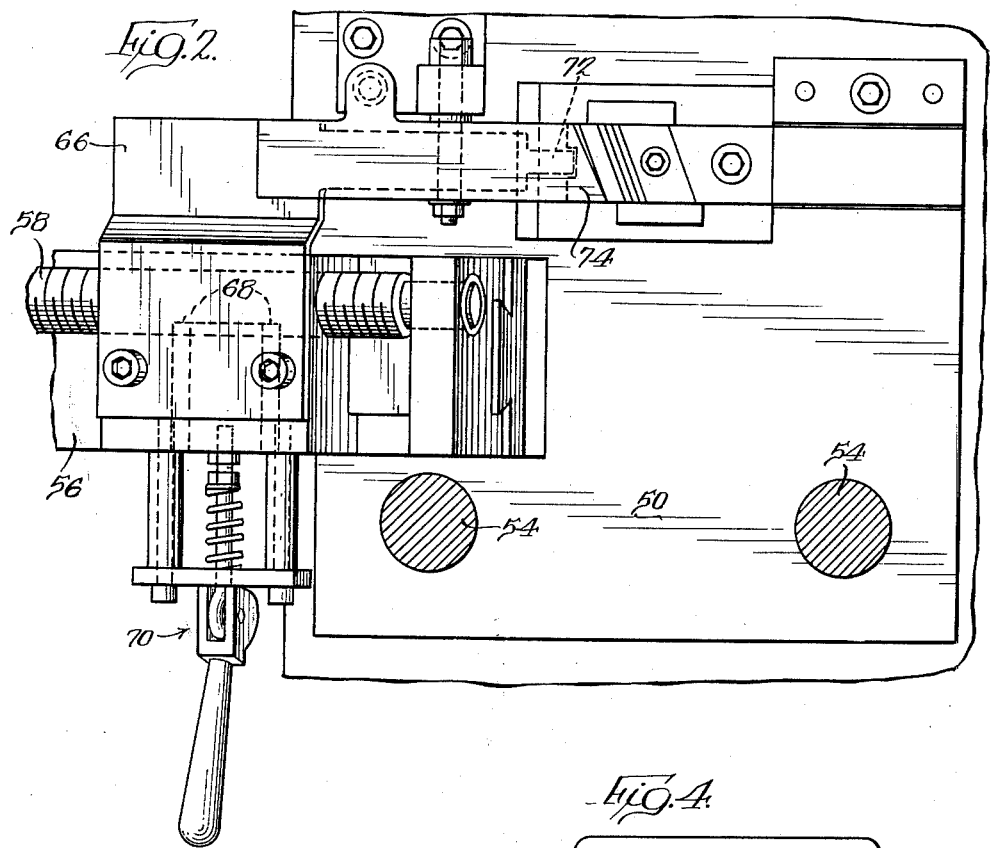
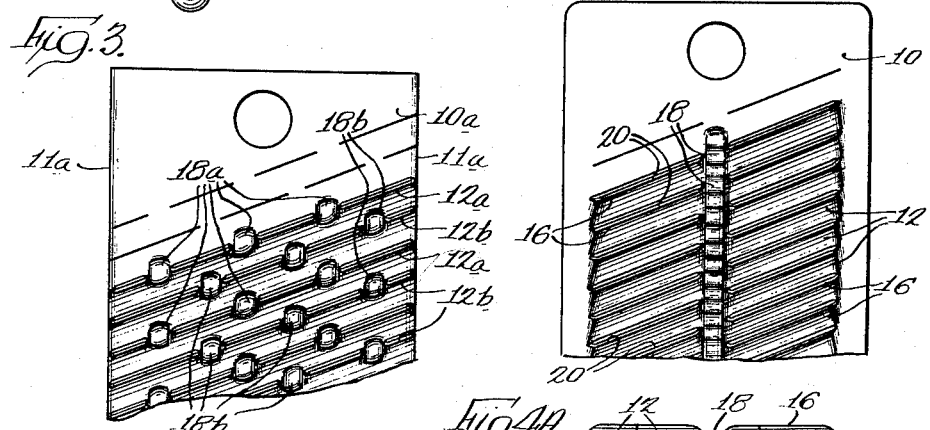
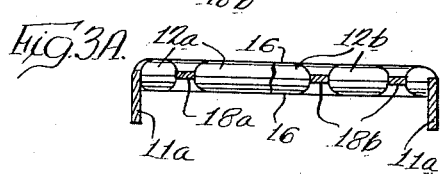
INVENTORS.
Robert E. Stutzke
Alvin B. Cox
BY Brown, Jackson, Boettcher & Dienner
Attys Feb. 12, 1963      R. E. STUTZKE ETAL      3,077,024
SHEET METAL FILE
Filed June 20, 1958      4 Sheets-Sheet 3
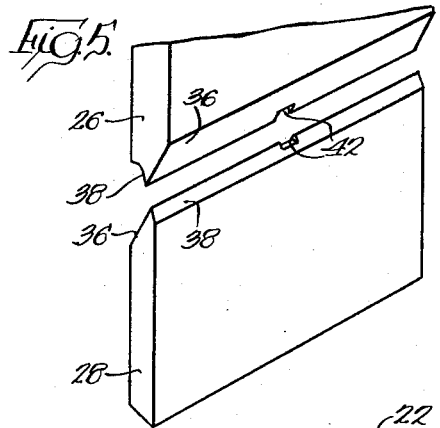
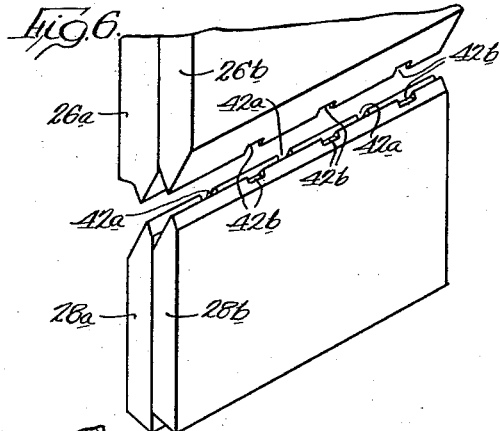
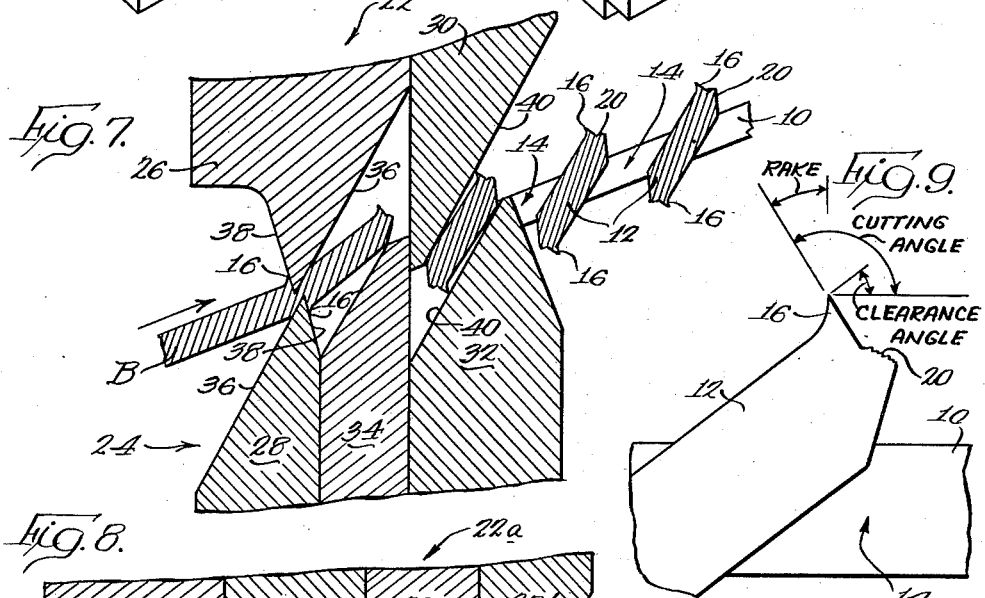
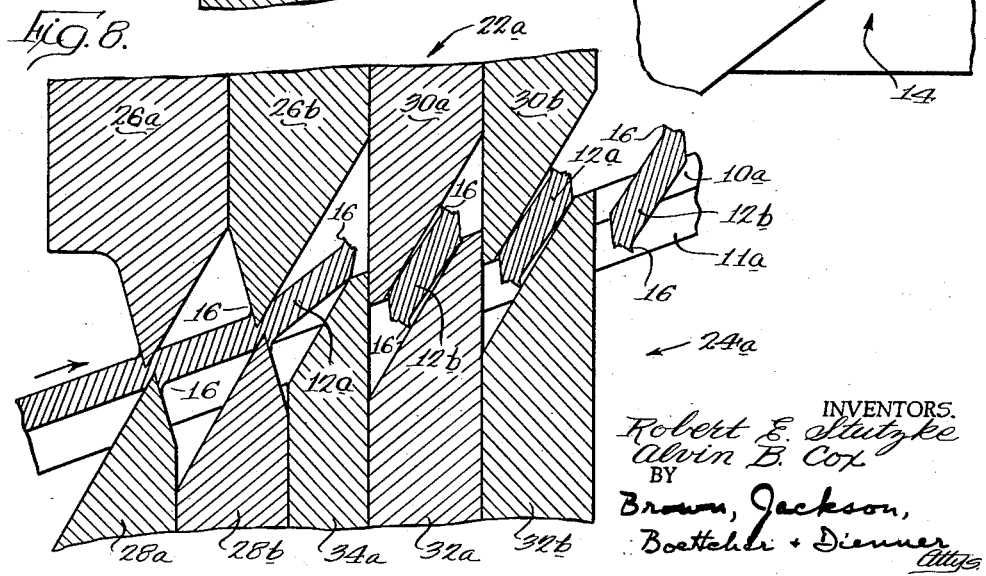
INVENTORS.
Robert E. Stutzke
Alvin B. Cox
BY Brown, Jackson,
Boettcher + Dienner
Attys.

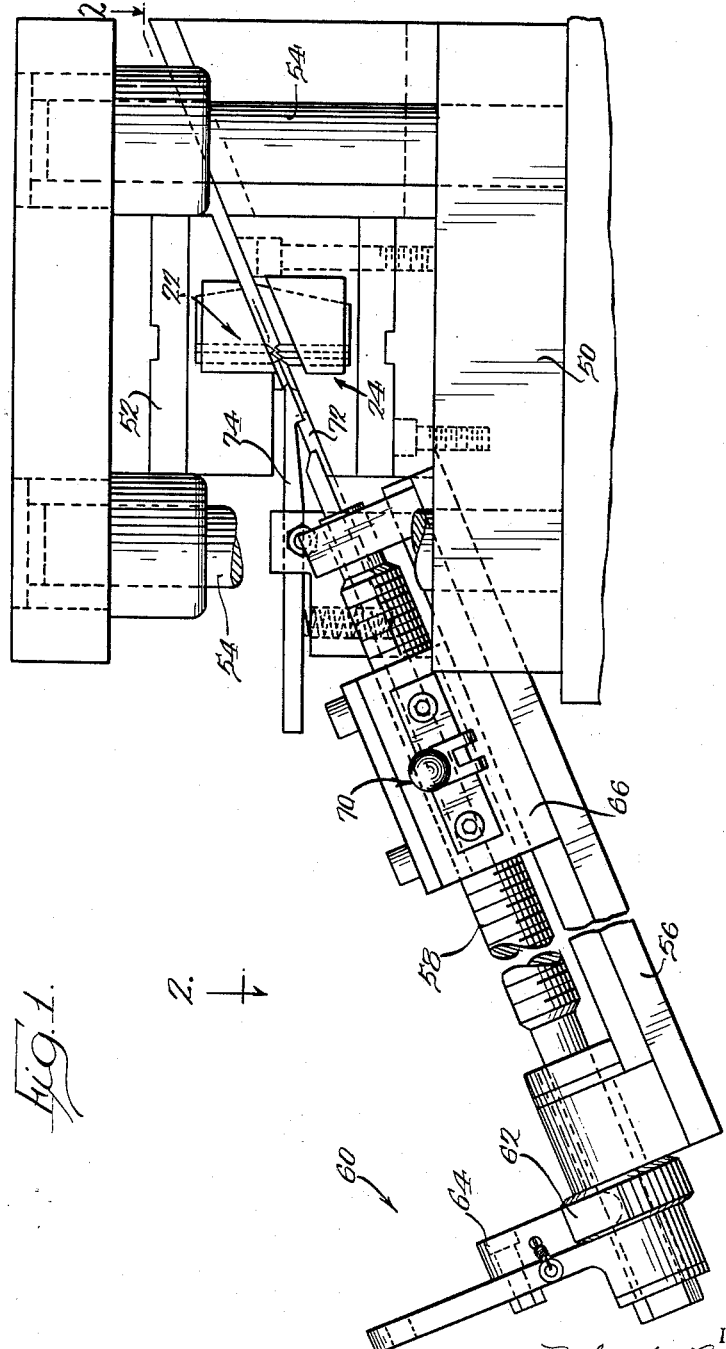

Feb. 12, 1963 R. E. STUTZKE ETAL 3,077,024
SHEET METAL FILE
Filed June 20, 1958 4 Sheets-Sheet 4
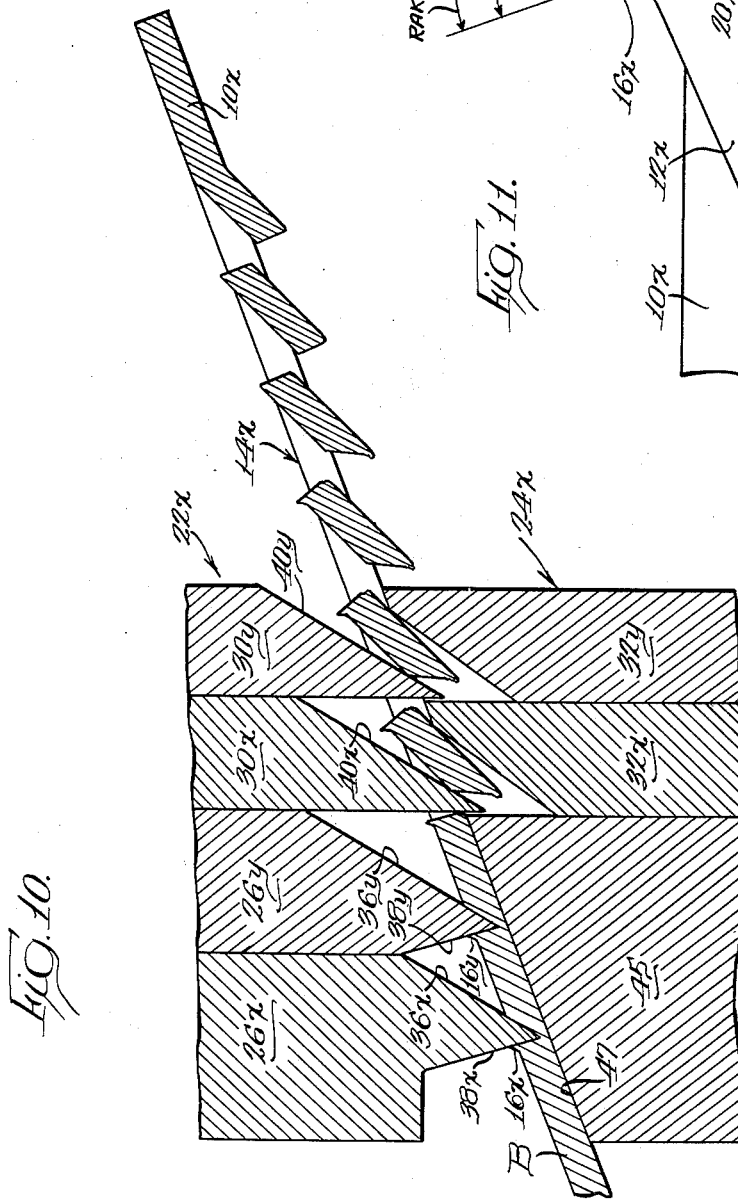
INVENTORS.
Robert E. Stutzke
Alvin B. Cox
BY
Brown, Jackson, Boettcher
& Dienner
Attys United States Patent Office 3,077,024
Patented Feb. 12, 1963

3,077,024
SHEET METAL FILE
Robert E. Stutzke, Louisville, and Alvin B. Cox, Lyndon, Ky., assignors to Vermont American Corporation, a corporation of Kentucky
Filed June 20, 1958, Ser. No. 743,286
7 Claims. (Cl. 29—78)

The present invention relates to sheet metal files and to methods of and apparatus for making the same.

The art of making files, rasps, planes and like tools for removal of relatively small amounts of material in the wood and metal working industries is an old art and replete with suggestions for making such tools or the cutting blades thereof from sheet metal blanks. In the file art, for example, it has been proposed to bend slats or louvers out of the plane of a sheet metal blank to afford a tool having a plurality of cutting teeth and slit-like openings between the teeth for chip clearance, which openings render the tool self-cleaning. In one proposal, the slats or louvers, in order to form cutting teeth, are bent out of the blank at a relatively low angle of inclination, suitable as a clearance angle, and the frontal edge of each slat or louver is ground off to a suitable cutting angle. Another proposal has been to bend the slats or louvers to a relatively large angle of inclination, at which the surfaces of the slats initially constituting the faces of the blank define a suitable cutting angle, and then grind off the outer edge portion of each slat to a suitable clearance angle. Also, relative to the latter type, it was proposed that the louvers initially be bent to an angle equal to the final cutting angle less the clearance angle, that the outer edges of the louvers or slats then be flat-ground simultaneously in a plane parallel to the plane of the blank, and that the louvers be subsequently bent by an amount equal to the clearance angle to complete the teeth. All of these proposed methods are directed to the formation of cutting teeth as such and involve transferring the blank from a cutting and bending die to a grinder, or from die-to-grinder-to-die, which is highly inconvenient and inefficient and adds considerably to the cost of the resultant product. Also, the cutting teeth in these prior art files, due to the fact that they are produced simply by grinding, are short lived in comparison to the cutting edges of the conventional solid type files wherein the edges are chiseled-up from the face of a solid blank. Since this latter type of file is produced economically and has a relatively long service life, sheet metal files have failed to attain a measurable degree of commercial success even though they afford excellent chip clearance and are not subject to clogging.

Recently, a further proposal has been made in the art to form a sheet metal file blade in its entirety in a slat or louver cutting and bending die. According to this proposal, the sheet metal blank is cut through at an angle to the plane thereof that is equal to the complement of the sum of the ultimate desired clearance angle and the ultimate desired face angle of the resulting tooth, and the tooth or louver is, as part of a single cutting and bending operation, bent from the plane of the blank by an angle equal to the said clearance angle. The angles recommended in practice of this proposal are to cut the blank at an angle of 60 degrees relative to the plane thereof and to bend each slat or louver as it is defined to an angle of 25 degrees relative to the plane of the blank, thereby to define a tooth having a clearance angle of 25 degrees, a cutting angle of 85 degress and a face angle of 5 degrees, the face of the tooth comprising the frontal edge of the louver. However, when this proposal is practiced in the manner outlined, a sharp cutting edge is not formed on the slats or louvers, due apparently to rounding of the corner defining the outer and alleged cutting edge of each tooth, and the proposed method therefore does not on its face produce an effective tool.

The object of the present invention is to provide an improved, highly efficient, practical and economical sheet metal file, and an improved method of and improved apparatus for making the file in its entirety in a die.

A more specific object of the invention is the provision of an improved method of making a sheet metal file characterized by the steps of throwing-up sharp burrs on a sheet metal blank and employing these burrs as the cutting edges of slats or louvers subsequently bent out of the plane of the blank. In this respect, we depart from the prior art in that we are concerned essentially with formation of sharp burrs for cutting purposes, coupled with the chip clearance functions of a slotted or louvered sheet, as opposed to the formation of cutting teeth in the conventional sense. By virtue of the sharp burr, we have found that we can produce at minimum cost a highly effective tool of exceedingly long life, particularly when the tool is hardened in any conventional manner. Stated in greater detail, the method of our invention comprises the steps of throwing-up spaced parallel burrs on a sheet metal blank, and bending the slats or louvers defined between adjacent burrs to an inclined position relative to the plane of the blank to dispose the burrs outermost and to open up chip clearance spaces between the burrs.

The complement of the above object is the provision of improved apparatus for forming the said burrs at spaced intervals on a sheet metal blank and for bending the slats or louvers defined between adjacent burrs relative to the plane of the blank to such angle as to constitute each burr a cutting edge and to open up chip clearance slots between the slats.

Another object of the invention is to provide an improved sheet metal file comprising a sheet metal member having a body portion and a plurality of slats or louvers bent from the plane of said portion at an angle thereto, the outermost edge of each slat having a sharp upstanding burr thereon, the burrs constituting the cutting edges of the file.

Other objects and advantages of the invention will become apparent in the following detailed description.

Now, in order to acquaint those skilled in the art with the manner of making and using our improved files and our improved apparatus for making the files, and of practicing our improved method, we shall describe, in connection with the accompanying drawings, preferred embodiments of the files, preferred apparatus for making the files, and the preferred manner of practicing the method of our invention.

In the drawings, wherein like reference numerals indicate like parts:

FIGURE 1 is a side elevation of the apparatus preferred for practice of our invention;

FIGURE 2 is a fragmentary view of the apparatus, the view being taken substantially on line 2—2 of FIGURE 1 and showing the lower die part in plan;

FIGURES 3 and 3A are, respectively, a fragmentary plan view and a cross-section of one embodiment of our improved files;

FIGURES 4 and 4A are, respectively, a fragmentary plan view and a cross-section of a second embodiment of our improved files;

FIGURE 5 is a fragmentary perspective view of the cutting dies employed in producing the file of FIGURE 4;

FIGURE 6 is a fragmentary perspective view of the cutting dies employed in producing the file of FIGURE 3;

FIGURE 7 is a fragmentary vertical section of the die members employed in the production of the file of FIGURE 4, the view being on an enlarged scale and illustrating in vertical longitudinal section the file produced by the dies;

FIGURE 8 is a fragmentary vertical section of the die members employed in the production of the file of FIGURE 3, the view illustrating in vertical longitudinal section the file produced by the dies;

FIGURE 9 is an enlarged fragmentary illustration of one cutting instrumentality as produced by the dies of FIGURES 7 and 8;

FIGURE 10 is a fragmentary vertical section, similar to FIGURE 8, of the die members employed in the production of a modification of the file of FIGURE 3, the view illustrating in vertical longitudinal section the modified file produced by the dies; and FIGURE 11 is an enlarged illustration of one cutting instrumentality as produced by the dies of FIGURE 10.

Referring first to FIGURES 4, 4A, 7 and 9, the overall object of this invention is to provide a sheet metal file comprising a generally planar body portion 10, from which a plurality of spaced parallel louvers or slats 12 are bent to form chip clearance slots 14 between the slats, each slat or louver having at its outermost edge a sharp upstanding burr 16 constituting the cutting edge of the file. For purposes of rigidity, each slat or louver 12 is interrupted to provide at least one re-enforcing land 18 along the length thereof. The particular formation of each louver is not especially critical according to the present invention, since we are not concerned with formation of a cutting tooth in the strict sense, but simply with the provision of the sharp upstanding burrs 16 and the clearance slots 14 therebetween. To facilitate the cutting action of the file, we prefer to form the slats or louvers at an inclination to the longitudinal axis of the blank, suitably an inclination of about 20 to 25 degrees.

As best shown in FIGURES 9 and 11, the form of louver we prefer is bent to an angle (which would, in the art of toothed cutters, be called the "clearance" angle) of from about 20 degrees to about 40 degrees, depending upon the form, or angle of formation, of the burrs 16. The upstanding burr should project generally normal to the plane of the body and is formed as a continuation of the outer portion of the frontal face 20 of the louver. This face projects from the body 10 of the file at an angle which should, in the terminology applied to conventional toothed cutters, be called the "cutting" angle. However, the "cutting" angle of our louver, instead of being an acute angle as is required in the art of toothed cutters, is an obtuse angle, and moreover, is considerably in excess of 90 degrees. Specifically, we prefer that this angle be from about 105 degrees to about 125 degrees, again depending upon the specific formation of the burr. In the preferred embodiment, the defined "cutting" angle results in a negative rake angle of from about 15 degrees to about 35 degrees, as opposed to the positive "face" angle provided on toothed cutters.

The louvers of our files are further distinguished from prior proposals in the art in that the frontal face 20 of each louver is stepped or irregular, including the outer portion above described and a step or irregularity adjacent thereto.

To provide the louver as above described, we are concerned first and primarily with formation of the sharp burr 16, since it is the critical element of our file. We have discovered that the burr is formed most effectively and efficiently by cutting into but not through the blank and by exerting a combined holding, cutting and wedging action on the blank.

Bearing this in mind, reference is now made to FIGURE 7 for disclosure of one manner of forming the burrs and making the files. As illustrated, the apparatus employed includes a pair of opposed die assemblies, indicated generally at 22 and 24, each including a cutter 26 and 28, respectively, and a bending die 30 and 32, respectively. The lower die assembly 24 also includes a break 34 disposed between the cutter 28 and the bending die 32. The die assemblies are adapted for relative movement in the vertical plane and define therebetween a path of blank movement that is inclined to the horizontal. The angle of inclination is not critical, but we prefer an angle of about 20–25 degrees for production of the preferred form of louver. As will be described, means are provided for incrementally advancing the sheet metal blank B step by step in an upward direction along this path, a given portion of the blank first encountering the two cutters 26 and 28 and on the next succeeding increment of advancement encountering the bending dies 30 and 32.

The cutters or cutting dies 26 and 28 each include a cutting edge, which edges are offset slightly from one another in the plane of the blank. Each edge constitutes the line of intersection of a pair of surfaces 36 and 38 which converge toward said edge from opposite sides of a vertical line intersecting the edge. The adjacent surfaces 36—36 of the two cutters form relatively low angles of inclination to the plane of the blank and the opposite surfaces 38—38 thereof form relatively high angles of inclination to the blank. We prefer that the surface 36 form an angle of about 30 degrees to the vertical, and that the surface 38 form an angle of about 15 degrees to the vertical. In particular, we prefer that the surface 38 define an angle relative to the plane of the blank that is greater than 90 degrees, so that this surface will have relief relative to the blank. However, due to the inclination of the blank, as the die assemblies are closed on the blank and the cutting edges cut into the same, the surface 38 of each die presses into positive engagement with the respective surface of the blank to force a sharp burr upwardly from the surface, as indicated at 16 in FIGURE 7. This forcing action is enhanced by the fact that each cutting die serves to anchor the blank for the other cutter so that there is no adverse relative movement or slipping of the blank relative to the dies. To assure attainment of this anchoring function, the die assemblies are bottomed or stopped short of cutting through the blank.

While the anchoring and burr raising functions as above described are taking place, the adjacent surfaces 36—36 of the two cutters further enhance both functions, and in particular contribute to the formation of a significant, and exceedingly sharp and durable burr. Specifically, as the die assemblies close on the blank, each surface 36 exerts, adjacent the respective surface of the blank, a wedging force on the portion of the blank engaged thereby, which wedging force is opposed to the above described burr raising force and causes, we believe, a localized shearing action adjacent the respective surface of the blank that causes the said surface portion to be drawn forcibly against the face 38 of the respective cutter, thereby to assure formation of the respective burr.

Consequently, as the die assemblies are bottomed, the two cutters 26 and 28 have raised burrs at the outer edges and have formed the inner and outer face portions of what will subsequently become the trailing face of one louver and the frontal face of the next adjacent louver. When bottomed, the cutters have not cut through the blank, as is clearly illustrated in FIGURE 7, and the said two faces of adjacent louvers are joined by a thin intervening portion adjacent the center of the blank.

To sever the said intervening portion between the adjacent louvers and to bend each louver (as defined between adjacent burrs on the same side of the blank) to an appropriate angle relative to the plane of the blank, the die assemblies are separated, the blank advanced one step, and the die assemblies again closed on the blank. As the die assemblies commence to close, the portion of the blank that was worked on by the cutters in the immediately preceding step is rested on the break 34 with the burr 16 on the lower surface of the blank to the forward side of the break and the burr 16 on the upper surface of the blank to the rearward side of the working edge of the break. As shown, the cutter 26 is relieved at the portion thereof overlying the break so as not to engage the upper burr 16. As the die assemblies close, the bending die 30 first engages the portion of the upper surface of the blank forwardly of the burr 16 last formed on said surface and forces the same downwardly relative to the supporting surface provided by the break 34, whereupon the blank is caused to be sheared at its weakest point, i.e., the said central portion thereof intervening between the said faces of adjacent louvers, the shearing action producing the above described step or irregularity in the face. This shearing action takes place at a location spaced from the burrs so that there is no danger that the burrs will be rounded off or otherwise flattened or dulled as a consequence of the bending operation. At substantially the same time as the trailing edge of one louver is severed from the frontal face of the next adjacent louver, the forward end of the lower surface of the louver now being worked upon is engaged by the bending die 32 whereupon the dies 30 and 32 cooperate in bending the slat or louver to an angular position relative to the plane of the blank, the shearing and bending steps causing the chip clearance slots 14 to be opened up between adjacent burrs.

Relative to the combined holding, wedging and cutting or scoring of the blank for the purpose of throwing-up the burr 16, it is to be observed that the bending die 30 contacts the blank and is forced into firm engagement therewith before the cutting or scoring die 26 contacts the blank. By virtue of this relationship, together with the cooperation between the inclined generally complementary faces of the bending die 30 and the louver being formed (which faces are opposed to the burr forming face of the die 26), the bending die 30 assists the cutters 26 and 28 and the faces 36—36 thereof in positively restraining the blank against slippage to the left or in the reverse direction, whereby the faces 38—38 of the dies 26 and 28 positively force up sharp burrs from the surfaces of the stationary blank.

In the preferred construction of the die assemblies, the adjacent faces 40—40 of the bending dies 30 and 32 are suitably formed at an angle of about 60 degrees to the horizontal. To avoid damage to the sharp burrs 16 during the bending step, the bending dies may be relieved or recessed in a known manner in the area adjacent the burrs, but we prefer simply to bottom or stop the die assemblies 22 and 24 before the bending dies 30 and 32 bottom on or engage flush against the full surface of the louver.

The bending step completes the formation of each louver to the form illustrated fragmentarily in FIGURE 9, so that upon separation of the die assemblies and incremental advance of the blank, the louver issuing from the die assemblies is a complete and highly efficient cutting instrumentality for the filing and/or planing of materials ranging from soft wood to metals having a Rockwell hardness of up to about 35.

The die assemblies are operated in timed sequence with the means for incrementally advancing the blank, thereby to form spaced parallel louvers throughout substantially the full length of the blank, body portions 10 being left at both ends to facilitate mounting of the file on a holder or the like. After the file has been formed in the manner described, it is preferably hardened, in any conventional or desired manner, to afford a tool of exceedingly long life.

In the embodiment of the file above described, the louvers are all identical and each include a single land or tie connection 18, which lands are aligned and continuous longitudinally of the blank. The lands or ties are accommodated by forming aligned recesses 42 at the central portion of the cutting edges of the cutters 26 and 28, see FIGURE 5, and by providing similar recesses in the same location on the bending dies. Since the louvers or slats are all identical, only a single pair of cutters and a single pair of bending dies are required to form the file.

Referring now to FIGURES 3, 3A, 6 and 8, we have illustrated a file that differs from the embodiment above described in that the same is of channel form in cross-section and is provided with staggered or interrupted rigidifying lands or tie connections between the louvers. The specific cross-sectional form of each louver, including its burr 16 is, however, the same as illustrated in FIGURE 9. As shown in FIGURE 3, the body of the file includes a planar portion 10a and depending marginal edge portions 11a. The louvers extend from edge portion to edge portion and are generally of two types, 12a and 12b, respectively, the louvers 12a each including three lands or ties 18a that are aligned in respective sets longitudinally of the file, and the louvers 12b each including three lands or ties 18b that are aligned in respective sets longitudinally of the file and staggered relative to the lands 18a.

To form the two different types of louvers, as opposed to the single type produced by the die assemblies of FIGURES 5 and 7, it is simply necessary, in general terms, to double the die means and the length of the incremental step of the blank advancing means. Specifically, as shown in FIGURE 8, the die assemblies 22a and 24a are provided with two pairs of cooperable cutters 26a—28a and 26b—28b, and with two pairs of cooperable bending dies 30a—32a and 30b—32b. The die 32a, in addition to its lower bending function, serves as a break for the die set 30b—32b, and the lower die assembly includes a a break 34a for the die set 30a—32a. As shown in FIGURE 6, the cutters 26b—28b are provided with aligned recesses 42b which accommodate retention of the lands 18b, and the cutters 26a—28a are provided with aligned recesses 42a which are staggered relative to the recesses 42b and accommodate retention of the lands 18a. By virtue of this construction, each time the dies are closed on a blank, the four cutting dies form the burrs 16 on one each of the two types of louvers, and the four bending dies bend up one louver of each type, in the same manner as described in conjunction with FIGURE 7. Upon each operation thereof, the advancing means advances the blank by a distance equal to two louvers, thereby to cause formation of two complete louvers on each cycle of operation. Obviously, if desired, the file of FIGURE 4 could also be formed two louvers at a time with die assemblies similar to those illustrated in FIGURE 8.

The double acting die assemblies illustrated in FIGURES 5 through 8 are ideal for the formation of a file of the cross-sectional configuration illustrated in FIGURE 4A, wherein the louvers are fully exposed at both faces of the file, for the reason that cutting edges are then formed on both faces whereby either face of the file may be used for performance of useful work. With a file of channel cross-section, as illustrated in FIGURE 3A, or of half-round form, however, the edges of the louvers extending between the side wall portions of the file are not generally accessible for performance of work and there is, therefore, no need to form cutting edges to the interior side of the channel or the like. Consequently die means of the type shown in FIGURE 10 are preferred for the manufacture of files of such cross-sectional configuration, and for files which are to have only a single working face.

For purposes of illustration, we have shown in FIGURE 10 double index die means, i.e., means for forming two louvers at a time, but it is to be understood as the description proceeds that this type of die means may be embodied in single index or other multiple index forms as desired. As shown, the upper die assembly 22x is very similar to the upper die assembly shown in FIGURE 8, the instant assembly including a pair of scoring or cutting dies 26x and 26y and a pair of severing and bending dies 30x and 30y. The lower die assembly 24x, like that shown in FIGURE 8, includes bending dies 32x and 32y cooperable respectively with the dies 30x and 30y, the die piece 32x also serving as a break for the die set 30y—32y. In this case, however, the lower cutting or scoring dies and the break are replaced by a unitary anvil 45 which underlies the scoring dies 26x and 26y and has an upper surface 47 that is inclined at the same angle to the horizontal as the path of blank movement, whereby the body portion of the blank rests flat against said anvil surface during the cutting or scoring operation. The upper edge portion of the anvil 45 constitutes a break for the die set 30x—32x, and the severing and bending dies 30x and 30y in this embodiment are sharply pointed, rather than being relieved as are the dies 30a and 30b in FIGURE 8.

In use of the die means of FIGURE 10, as the upper die assembly 22x is closed on the lower assembly 24x, the bending dies 30x and 30y first engage the blank B substantially simultaneously and are forced into firmly retentive engagement therewith. Subsequently, the scoring dies 26x and 26y substantially simultaneously engage and are forced into the blank to raise sharp burrs 16x and 16y from the surface of the blank. During the burr raising operation, the blank is held against longitudinal movement, especially in the reverse direction, i.e., to the left, by virtue of the firmly retentive engagement of the dies 30x and 30y with the blank. Since the inclined faces 40x and 40y of the dies 30x and 30y are opposed to the burr raising faces 38x and 38y of the dies 26x and 26y, the bending dies perform an ideal holding function. At the same time, the faces 36x and 36y of the dies 26x and 26y exert wedging forces on the blank opposed to the burr raising forces, thereby to insure formation of significant burrs. As will be noted, the scoring dies are forced into but not through the blank.

The upper die assembly is then moved away from the lower assembly and the blank advanced an increment equal to two louvers, whereafter the upper die is closed on the lower die. As the bending dies 30x and 30y engage the blank, the same enter two adjacent scores previously made by the scoring dies just forwardly of the respective burrs and sever from the blank a pair of louvers, which they thereafter bend to an appropriate inclination relative to the blank. Consequently, each time the dies separate and the blank is advanced, two finished louvers issue from the apparatus.

The completed louver formed by the apparatus of FIGURE 10 is illustrated in FIGURE 11, from which it will be noted that the louver is characterized by the same distinctive features as the louver shown in FIGURE 9. For purposes of comparison, the same reference numerals as employed in FIGURE 9 are used in FIGURE 11 with the suffix x. The differences between the two louvers are essentially two; first, that the louver of FIGURE 11 has a burr only at its outer forward edge, whereas the louver of FIGURE 9 (see FIGURES 7 and 8 also) has burrs both at its outer forward edge and lower rearward edge, and second, that the interruption or step in the frontal face of the louver of FIGURE 11 is adjacent the inner edge thereof, whereas the step is intermediate the edges of the face in the louver of FIGURE 9. The clearance and rake angles of both louvers fall within the ranges previously stated herein, and the sharp burr in each case is disposed outermost and projects generally normal to the plane of the blank, the louvers providing therebetween large chip clearance spaces.

In the presently preferred embodiment thereof, the louver has a clearance angle of about 25 degrees and a negative rake angle of approximately 19 degrees. With the apparatus illustrated, a desirable working range is a clearance angle of from 25 degrees to 30 degrees and a negative rake angle from 19 degrees to 24 degrees. In its passage through the dies, the blank is preferably inclined at about 21 degrees to the horizontal (considering the upper die assembly to reciprocate vertically) and the inclination of the die piece faces to vertical is preferably as follows: the burr raising face (38) of the scoring die (26—28) 15 degrees; the wedge surface (36) of the scoring die (26—28) 30 degrees; and the bending surface (40) of the bending dies (30—32) 30 degrees; the bending die sets having sufficient clearance between the dies thereof when the die assemblies are bottomed to bend the louver to an inclination of 25–30 degrees to the plane of the blank, 46–51 degrees to horizontal, whereby the bending dies are held out of engagement with the sharp burrs.

In working on a blank with the illustrated die means, the bending dies on the first stroke of the upper die engage the lead end portion of the blank and form full or partial louvers that are not provided with sharp burrs, since this portion of the blank was not engaged by the scoring dies. Consequently, with the die means of FIGURE 10, as shown therein, a partial louver and two full louvers are formed that do not have sharp edges. The die means of FIGURE 8 perform in like manner. With the die means of FIGURE 7, one partial louver and one full louver are absent the sharp burr. This is simply mentioned for purposes of completing the description of the results produced by the die means, since in a file blade about 10 inches long having approximately 85 full louvers therein, the absence of a cutting edge on one or two of the louvers at the lead end of the file is of no practical consequence. Also, at the trailing end of the file, the double index die means of FIGURES 8 and 10 will leave two score marks on the blank as shown in FIGURE 3, and the single index die means of FIGURE 7 will leave one score mark as shown in FIGURE 4.

Referring now to FIGURES 1 and 2, we have illustrated apparatus suitable for actuating the die assemblies of FIGURES 7, 8, and 10 and for advancing the blank relative to the dies. The apparatus comprises a conventional punch press having a stationary bed 50 and a movable head 52 mounted for vertical reciprocation on upright guide bars 54 having a fixed mounting relative to the bed 50. Fixedly mounted on the bed 50 is the lower die assembly 24, while the upper die assembly 22 is carried by the head 52 for vertical reciprocation relative to the assembly 24, the two assemblies defining therebetween an inclined path of advancement for the blank. Mounted at the same inclination on the bed 50 is a generally U-shaped frame 56 between the legs of which an advancing screw 58 is journalled.

The screw 58 includes a drive shaft extending through the lower leg of the U-shaped frame and is equipped at its lower end with an intermittent drive means 60, which may suitably be manually actuated. In the illustrated structure, the means 60 comprises a ratchet member 62 fixed to the screw and a pawl 64 journalled on the screw, the pawl being arcuately movable between predetermined end positions and having a one-way driving connection with the ratchet, thereby to rotate the screw a predetermined amount in advancing direction upon each actuation thereof.

Mounted on the frame 56 for sliding movement therealong, preferably in a dove-tailed assembly, is an advancing member 66 which includes a screw follower 68 normally engaging the screw 58, cam actuated means 70 for moving the follower 68 into and out of cooperative engagement with the screw, a guiding and abutment member 72 for engaging in and against the trailing end of the sheet metal blank for advancing it between the dies, and a spring biased hold-down 74 cooperating with the abutment member and the blank for retaining the blank on said member.

In use, the means 70 is first actuated to release the follower 68 from the screw 58, whereupon the member 66 is manually slid downwardly on the frame 56 to its rearwardmost position, the follower 68 then being moved back into cooperative engagement with the screw. The hold-down 74 is released momentarily and a blank slipped into place on the member 72, whereafter the hold-down is engaged with the blank. The press may then be set into operation, and each time the head moves upwardly away from the bed, the pawl 64 is actuated to cause the member 66 and the blank to be advanced on step relative to the die assembly. When the file has been formed, the member 66 is again slid rearwardly on the frame, whereupon the finished file may be removed and a new blank put in place for repetition of the steps described.

Thus, it is to be appreciated that the file is formed in a highly convenient, economical and practical manner, by apparatus and performance of a method that afford substantial improvements over the proposals of the prior art, and that result in a distinctively improved sheet metal file of exceedingly long service life.

By virtue of the described method and apparatus, each louver presents a sharp burr which extends generally normal to the plane of the body and constitutes an effective and efficient cutting edge. With the dies of FIGURES 7 and 8, either side of the resultant file may be utilized for performing a filing or planing function. Moreover, by turning the louvers to a slightly higher angle relative to the plane of the file body than indicated hereinbefore, each burr can be rendered capable of performing useful work in both directions of reciprocation of the file. We find, however, that generally the most useful work is performed by the louver form illustrated in FIGURE 11 upon movement of the file to the right as the same is viewed in said figure.

From the foregoing, it is to be appreciated that the objects and advantages of the present invention have all been shown to be obtained in a highly convenient, economical and practical manner.

While we have shown and described what we regard to be the preferred embodiments of our files, and the preferred embodiments of our method of and apparatus for making the files, it is to be appreciated that various changes, rearrangements, and modifications may be made in these embodiments without departing from the scope of the invention as defined by the appended claims.

We claim:

1. A file comprising a sheet metal member having a body portion and a plurality of louvers bent out of said portion at an angle thereto, each of said louvers having a frontal face extending beyond the plane of the adjacent surface of the body portion and disposed at a negative rake angle, the said frontal face of the louvers each including a sharp upstanding burr along the length of its outermost edge constituting a cutting edge having one surface as a continuation of said face, the spaces between adjacent burrs being open and facilitating clearance of chips from said edges.

2. In a sheet metal file having a body portion and a plurality of louvers bent out of said body portion at an inclination thereto to open up the spaces between adjacent louvers for chip clearance, the improvement comprising a sharp upstanding burr along the length of the outermost edge of each louver having one surface as a continuation of the frontal face of the louvers and the point of the burr projecting outwardly of the body portion generally normal thereto.

3. A sheet metal file comprising a body portion, a plurality of parallel louvers bent out of said portion at an inclination in the order of about 20 to 40 degrees thereto, the space between adjacent louvers being open, the front edge of each louver including an outer face portion inclined at a negative rake angle of the order of about 15 to 35 degrees, and a sharp burr at the outermost edge portion of each louver formed as a continuation of said face portion, the point of each burr projecting in a direction generally normal to the plane of said body portion.

4. In a sheet metal file having a body portion and a plurality of louvers bent out of said body portion at an inclination thereto to open up the spaces between adjacent louvers for chip clearance, the improvement comprising a sharp upstanding burr on the outermost edge of the frontal face of each louver, each burr having a forward edge surface comprising a continuation of said frontal face and lying in the plane thereof inclined at a negative rake angle of the order of about 15 to 35 degrees, the rear surface of said burr merging along an arc into the adjacent surface of the louver.

5. A sheet metal file comprising a body portion, a plurality of parallel louvers bent out of said portion at an inclination to the remainder of the body portion, the space between adjacent louvers being open, the front edge of each said louvers including an outer face inclined at a negative rake angle, and a sharp upstanding burr along the length of the outermost edge portion of said face of each louver having one surface formed as a continuation of said face of the louver, said burr having its rear surface turned from the adjacent surface of the louver along a gradual arc to define with its first surface a sharp point along the length of said louver face, said sharp point projecting in a direction generally normal to the plane of said body portion.

6. A sheet metal file comprising a body portion, a plurality of parallel louvers bent out of said portion at an inclination to the remainder of the body portion, the space between adjacent louvers being open, the front edge of each said louvers including an outer planar face portion inclined at a negative rake angle, and a sharp upstanding burr along the length of the outermost edge portion of said face having one surface formed as a continuation of said planar face portion of the louver and in the general plane thereof, said burr having its rear surface turned from the adjacent surface of the louver along an arc to define with its first surface a sharp point along the length of said louver face, said sharp point projecting in a direction generally normal to the plane of the body portion, the front edge of said louvers further being stepped at a location spaced inwardly from said burr.

7. A sheet metal file comprising a body portion, a plurality of parallel louvers bent out of said portion at an inclination to the remainder of the body portion, the space between adjacent louvers being open, the front edge of each said louvers including an outer face inclined at a negative rake angle, and a sharp upstanding burr along the length of the outermost edge portion of said face of each louver having one surface formed as a continuation of said face of the louver, said burr having its rear surface turned from the adjacent surface of the louver along an arc to define with its first surface a sharp point along the length of said louver face, said sharp point projecting in a direction generally normal to the plane of said body portion, the front edge of said louvers further being stepped at a location spaced from said burr, and said louvers being interrupted to provide at least one reinforcing land along the length thereof.

References Cited in the file of this patent

UNITED STATES PATENTS

| | | |
|---|---|---|
| 1,466,391 | Eskew et al. | Aug. 28, 1923 |
| 1,896,199 | Peiseler | Feb. 23, 1933 |
| 2,058,912 | Reid | Oct. 27, 1936 |
| 2,525,949 | Sabre | Oct. 17, 1950 |
| 2,708,376 | Booth | May 17, 1955 |
| 2,769,225 | Booth | Nov. 6, 1956 |
| 2,823,562 | Humbarger | Feb. 18, 1958 |

FOREIGN PATENTS

| | | |
|---|---|---|
| 4,356 | Great Britain | Feb. 22, 1909 |
| 15,013 | Sweden | Dec. 7, 1900 |
| 666,573 | Great Britain | Feb. 13, 1952 |
| 753,501 | Great Britain | July 25, 1956 |
| 772,738 | Great Britain | Apr. 17, 1957 |